(12) United States Patent
Quach et al.

(10) Patent No.: US 8,002,310 B2
(45) Date of Patent: Aug. 23, 2011

(54) METHOD AND APPARATUS FOR PLACING AN INFLATABLE CURTAIN IN A STORED CONDITION

(75) Inventors: Thanh H. Quach, Macomb, MI (US); Mike P. Pionk, Marysville, MI (US); Ali Emam Bakhsh, Rochester Hills, MI (US); Serena M. Lynch, Munger, MI (US)

(73) Assignee: TRW Vehicle Safety System Inc., Washington, MI (US)

( * ) Notice: Subject to any disclaimer, the term of this patent is extended or adjusted under 35 U.S.C. 154(b) by 715 days.

(21) Appl. No.: 11/788,997

(22) Filed: Apr. 23, 2007

(65) Prior Publication Data
US 2008/0258442 A1 Oct. 23, 2008

(51) Int. Cl.
*B60R 21/16* (2006.01)
(52) U.S. Cl. ............ 280/730.2; 280/743.1; 493/454
(58) Field of Classification Search .......... 280/728.1, 280/728.2, 730.2, 743.1, 739; 493/449, 457, 493/458
See application file for complete search history.

(56) References Cited

U.S. PATENT DOCUMENTS

| | | | | |
|---|---|---|---|---|
| 5,493,846 A * | 2/1996 | Baker et al. | ..................... | 53/429 |
| 5,694,737 A * | 12/1997 | Lunt et al. | ..................... | 53/119 |
| 5,803,483 A * | 9/1998 | Lunt | ..................... | 280/728.1 |
| 6,110,094 A * | 8/2000 | Wallentin et al. | ............. | 493/454 |
| 6,176,515 B1 * | 1/2001 | Wallner et al. | ............. | 280/730.2 |
| 6,248,052 B1 * | 6/2001 | Kleeberger et al. | ........... | 493/374 |
| 6,390,502 B1 * | 5/2002 | Ryan et al. | ................. | 280/743.2 |
| 6,616,587 B2 * | 9/2003 | Kleeberger et al. | ........... | 493/457 |
| 6,626,456 B2 * | 9/2003 | Terbu et al. | ................ | 280/728.2 |
| 6,648,368 B2 * | 11/2003 | Smith et al. | ................ | 280/730.2 |
| 6,739,622 B2 * | 5/2004 | Halford et al. | ............ | 280/743.1 |
| 6,758,490 B2 * | 7/2004 | Hoeft et al. | ................ | 280/730.2 |
| 7,159,896 B2 * | 1/2007 | Ochiai et al. | ................ | 280/730.2 |
| 2003/0047926 A1 * | 3/2003 | Varcus et al. | ............. | 280/743.1 |
| 2005/0189745 A1 * | 9/2005 | Tanaka et al. | ............. | 280/730.2 |
| 2005/0206133 A1 * | 9/2005 | Hochstein-Lenzen | ..... | 280/728.2 |
| 2006/0172874 A1 * | 8/2006 | Sugaya et al. | ................ | 493/458 |

FOREIGN PATENT DOCUMENTS

EP 924122 A1 * 6/1999
GB 2382803 A * 6/2003

OTHER PUBLICATIONS

Kopetzky et al., Safety device for a vehicle, Jun. 23, 1999, EPO, EP 0 924 122 A1, English Abstract.*

* cited by examiner

*Primary Examiner* — Ruth Ilan
*Assistant Examiner* — James English
(74) *Attorney, Agent, or Firm* — Tarolli, Sundheim, Covell & Tummino LLP

(57) ABSTRACT

An apparatus (10) helps to protect an occupant (28) of a vehicle (12) that has a side structure (16) and a roof (18). The apparatus (10) includes an inflatable vehicle occupant protection device (14) that has a stored condition for being positioned along the vehicle roof (18). The protection device (14) is inflatable away from the vehicle roof (18) to a deployed condition positioned between the side structure (16) and a vehicle occupant (28). The protection device (14) further comprises a portion (38) for receiving an elongated member (94) for helping to place the protection device in the stored condition.

27 Claims, 7 Drawing Sheets

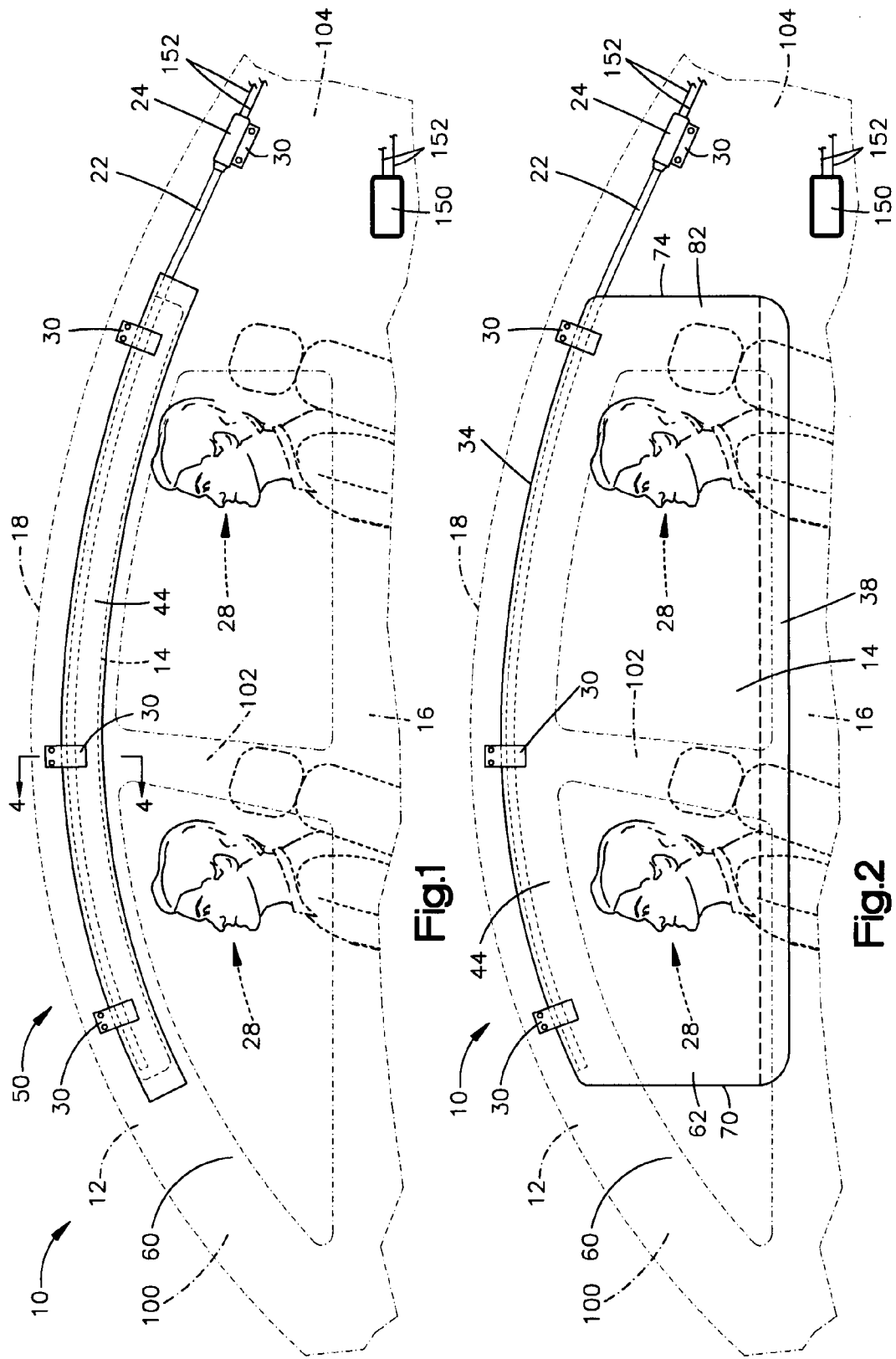

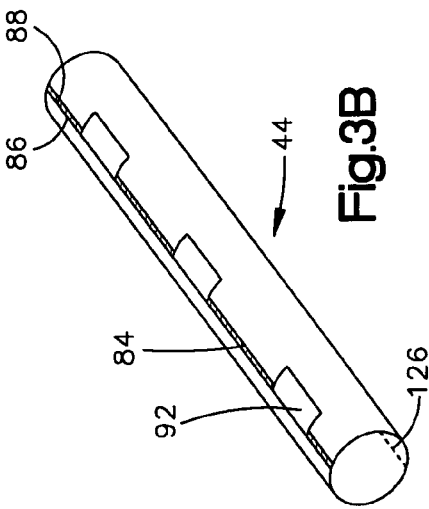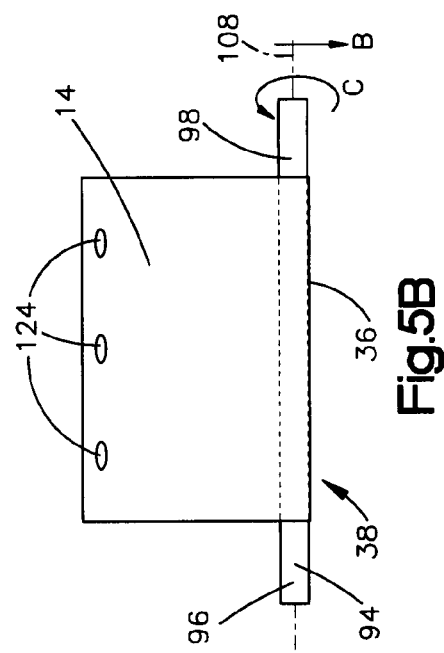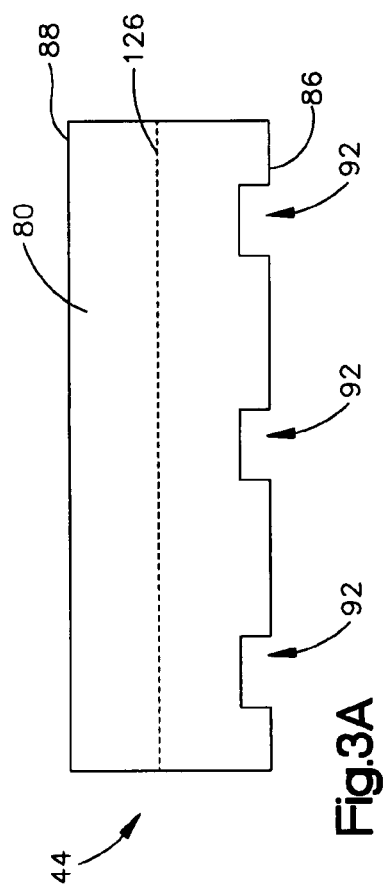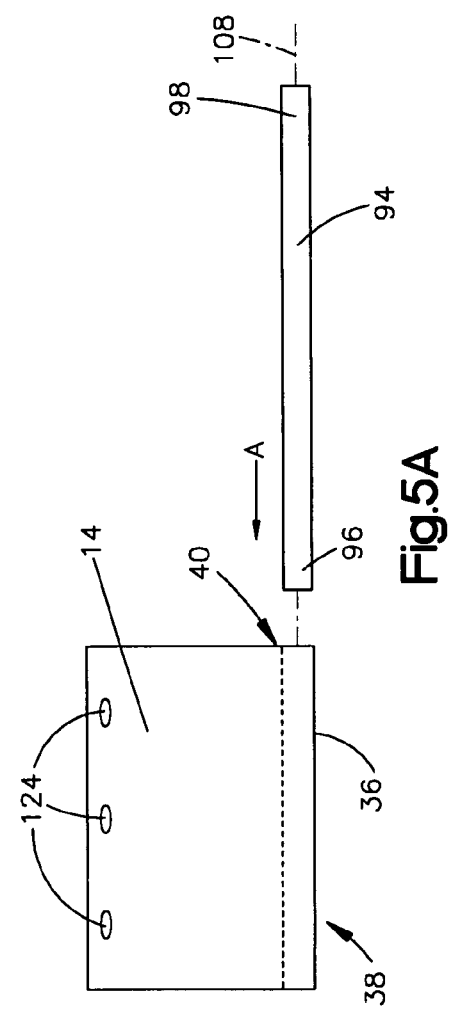

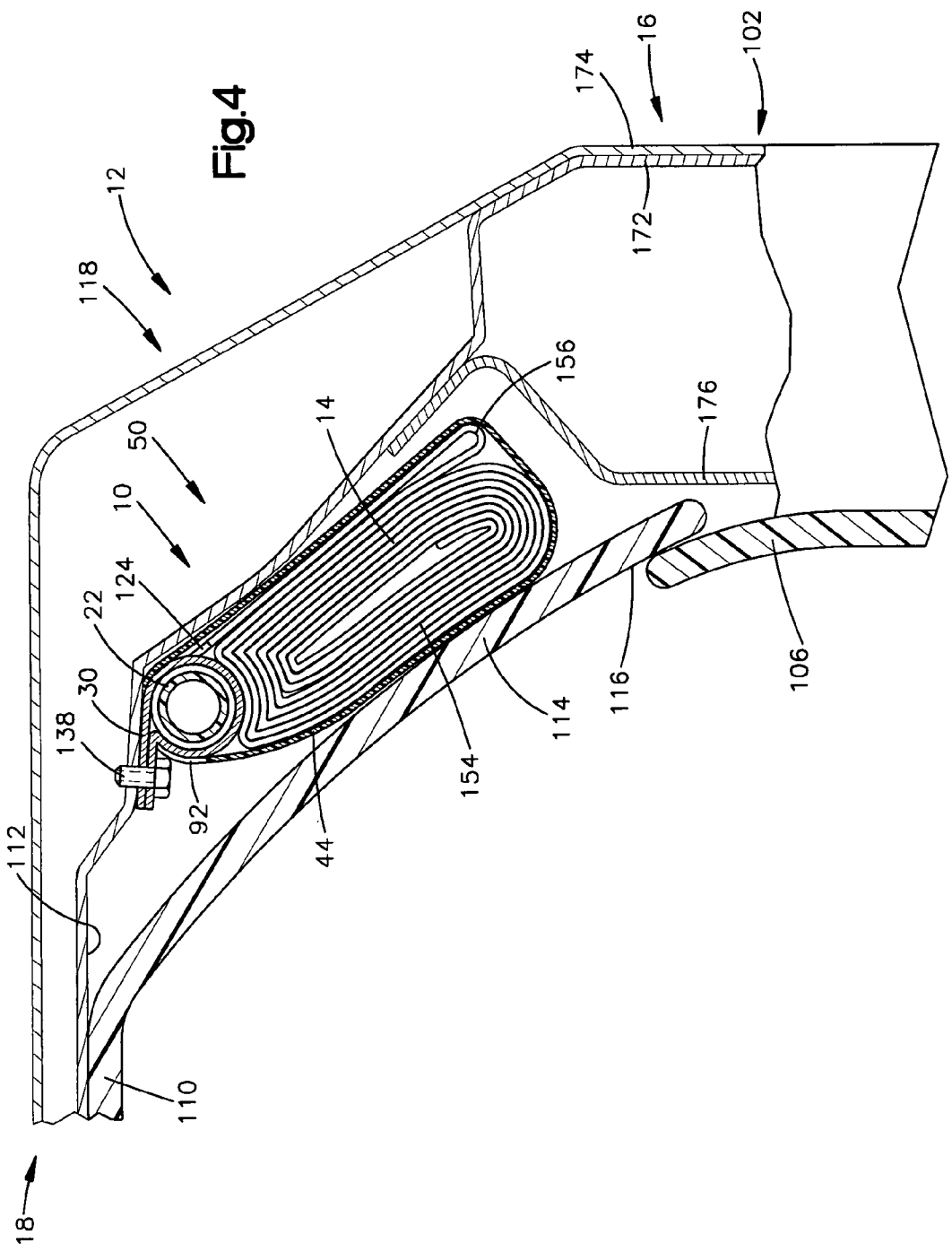

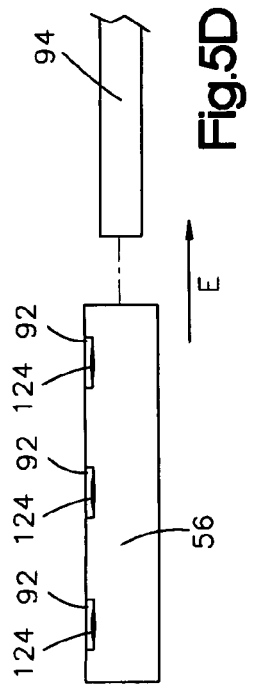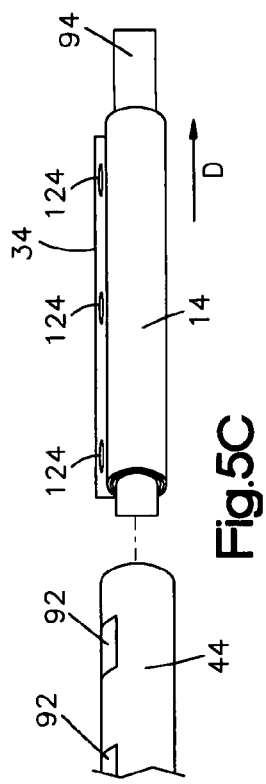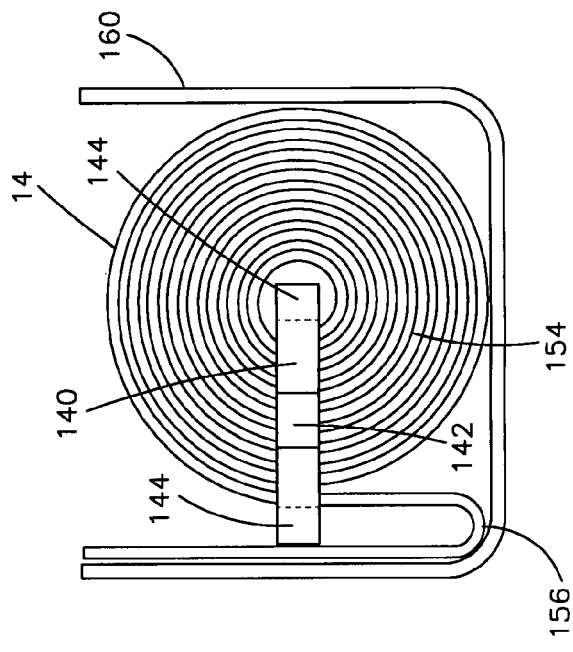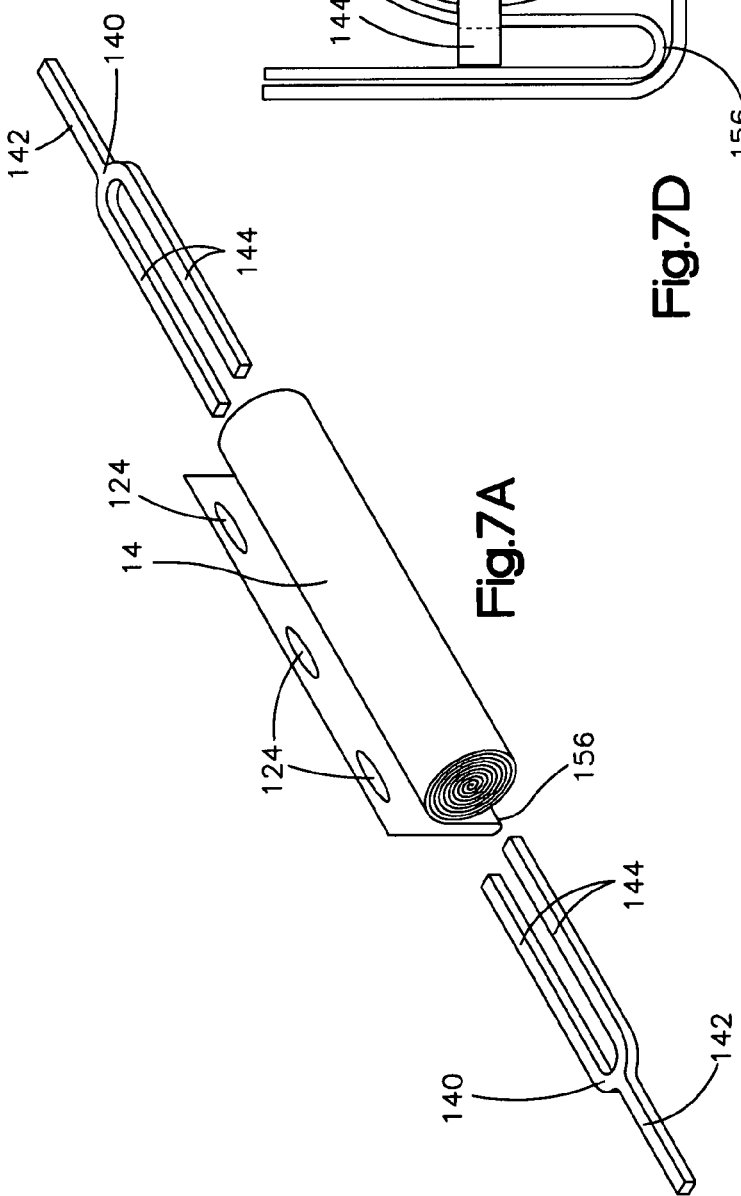

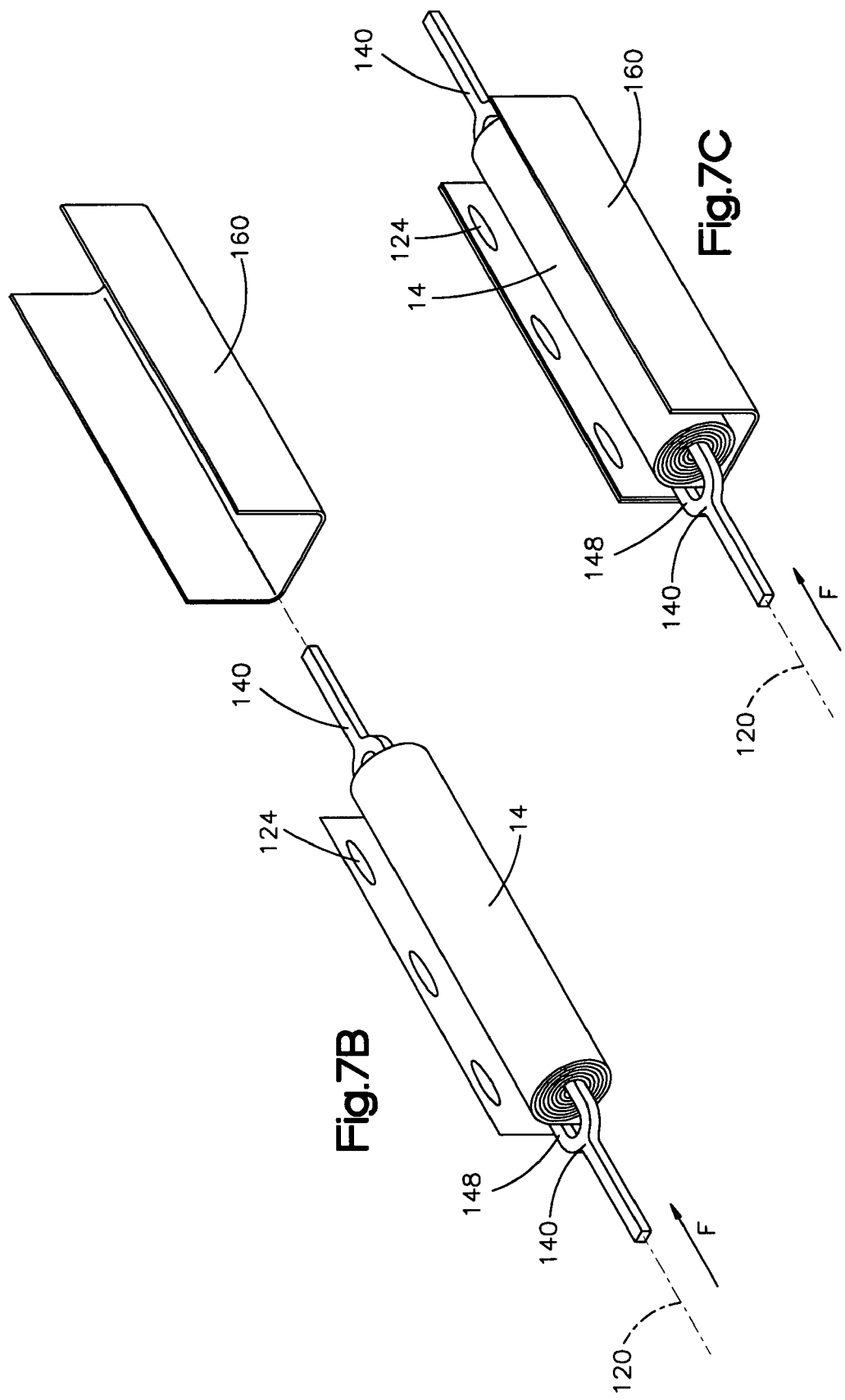

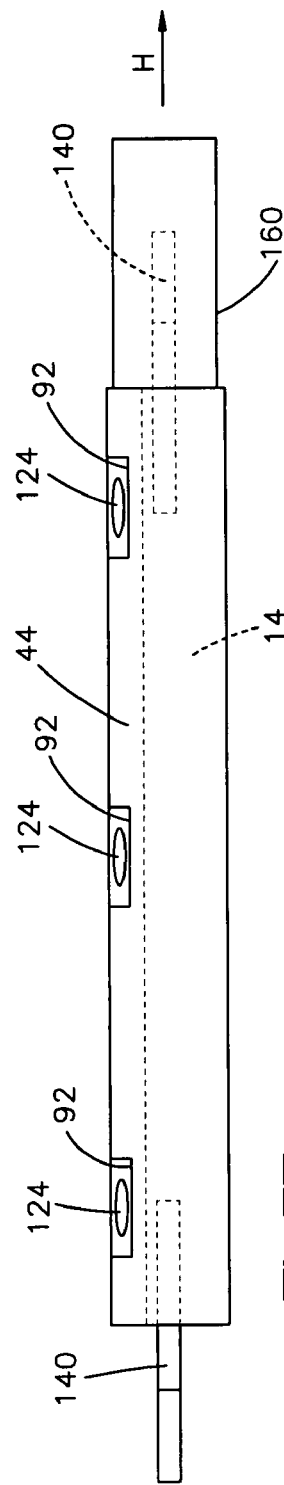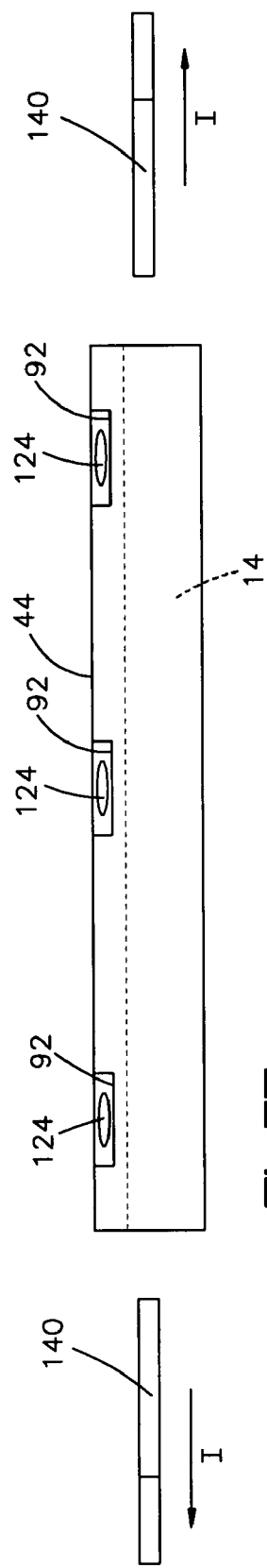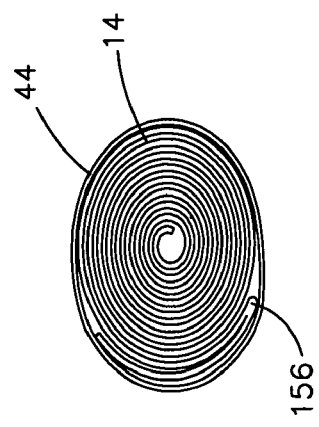

METHOD AND APPARATUS FOR PLACING AN INFLATABLE CURTAIN IN A STORED CONDITION

TECHNICAL FIELD

The present invention relates to an inflatable vehicle occupant protection device for helping to protect an occupant of a vehicle.

BACKGROUND OF THE INVENTION

It is known to inflate an inflatable vehicle occupant protection device to help protect a vehicle occupant upon the occurrence of an event for which occupant protection is desired, such as a vehicle collision or rollover. One particular type of inflatable vehicle occupant protection device is an inflatable curtain. Inflatable curtains are inflatable away from a vehicle roof to a deployed position between a side structure of the vehicle and a vehicle occupant.

SUMMARY OF THE INVENTION

The present invention relates to an apparatus for helping to protect an occupant of a vehicle that has a side structure and a roof. The apparatus comprises an inflatable vehicle occupant protection device having a stored condition for being positioned along the vehicle roof. The protection device is inflatable away from the vehicle roof to a deployed condition positioned between the side structure and a vehicle occupant. The protection device further comprises a portion for receiving an elongated member for helping to place the protection device in the stored condition.

The present invention also relates to an apparatus for helping to place an inflatable vehicle occupant protection device in a stored condition. The apparatus comprises at least one forked member for maintaining a fold in the protection device while the protection device is placed in a cover.

The present invention also relates to a method for placing an inflatable vehicle occupant protection device in a stored condition. The method includes the step of providing an inflatable vehicle occupant protection device and inserting an elongated member in a portion of the protection device. The elongated member is rotated about a longitudinal axis of the elongated member to help manipulate the protection device to place the protection device in the stored condition. The manipulation of the protection device includes at least one of rolling and folding the protection device.

The present invention further relates to a method for helping to protect an occupant of a vehicle that has a side structure and a roof. The method comprises the step of providing an inflatable vehicle occupant protection device. The protection device is placed in at least one of a rolled and folded condition. The protection device is then placed in an elongated channel. The channel and protection device are inserted into a cover. The channel is then removed, which leaves the protection device packaged in the cover.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is a schematic view illustrating a stored condition of an apparatus for helping to protect an occupant of a vehicle, according to the present invention;

FIG. 2 is a schematic view illustrating a deployed condition of the apparatus of FIG. 1;

FIG. 3A is a plan view of a cover portion of the apparatus;

FIG. 3B is an isometric view of the cover of FIG. 3A in an assembled condition;

FIG. 4 is a sectional view taken generally along line 4-4 in FIG. 1;

FIGS. 5A-5D are schematic views illustrating the assembly of portions of the apparatus according to a first embodiment of the present invention;

FIGS. 7A-7G illustrate the assembly of portions of the apparatus according to the present invention.

DESCRIPTION OF EMBODIMENTS

Figure 6A:
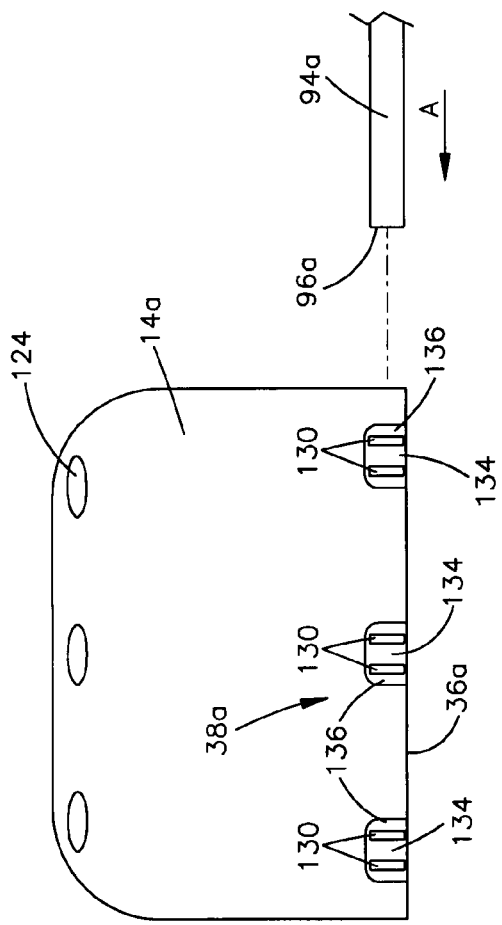
FIGS. 6A and 6B illustrate the assembly of portions of the apparatus according to a second embodiment of the present invention.

Representative of the present invention, FIGS. 1 and 2 illustrate an apparatus 10 for helping to protect occupants 28 of a vehicle 12. The apparatus 10 includes an inflatable vehicle occupant protection device in the form of an inflatable curtain 14. The inflatable curtain 14 has a stored condition, shown in FIG. 1, in which the deflated curtain is rolled, folded, or rolled and folded, and positioned adjacent the intersection of a side structure 16 and a roof 18 of the vehicle 12. The inflatable curtain 14 is inflatable from the stored position in a direction away from the roof 18 to a deployed position shown in FIG. 2. In the deployed position, the inflated curtain 14 extends along the side structure 16 and is positioned between the side structure and any occupants 28 of the vehicle 12.

The inflatable curtain 14 can be formed from any suitable material. For example, the inflatable curtain 14 may be formed from a fabric woven with nylon yarns (e.g., nylon 6-6 yarns). Also, the inflatable curtain 14 may have any suitable construction. For example, the inflatable curtain 14 may have a one piece woven (OPW) construction in which the curtain is woven as a single piece of material. As another example, the inflatable curtain 14 may be constructed by interconnecting fabric panels via means, such as stitching, ultrasonic welding, heat bonding, or adhesives.

The inflatable curtain 14 may be uncoated, coated with a material, such as a gas impermeable urethane, or laminated with a material, such as a gas impermeable film. The inflatable curtain 14 thus may have a gas-tight or substantially gas-tight construction. Those skilled in the art will appreciate that alternative materials, such as polyester yarn, and alternatives coatings, such as silicone, may also be used to construct the inflatable curtain 14.

The apparatus 10 also includes an inflation fluid source in the form of an inflator 24. The inflator 24 is actuatable to provide inflation fluid for inflating the inflatable curtain 14. The inflator 24 may be of any suitable construction or configuration. For example, the inflator 24 may contain a stored quantity of pressurized inflation fluid (not shown) in the form of a gas for inflating the inflatable curtain 14. As another example, the inflator 24 could contain a combination of pressurized inflation fluid and ignitable material for heating the inflation fluid, or could be a pyrotechnic inflator that uses the combustion of gas-generating material to generate inflation fluid. As a further example, the inflator 24 could be of any suitable type or construction for supplying a medium for providing inflation fluid for inflating the inflatable curtain 14.

In the embodiment illustrated in FIG. 1, the inflator 24 is connected in fluid communication with the inflatable curtain 14 through a conduit or fill tube 22. The fill tube 22 may be constructed of any suitable material, such as metal, plastic, or fabric. Alternatively, the fill tube 22 may be omitted and inflation fluid could be discharged into the inflatable curtain 14 from the inflator 24 directly or through a manifold.

The fill tube 22 may also have any suitable configuration. For example, the fill tube 22 may extend substantially along the entire length of the inflatable curtain 14, as shown in FIGS. 1 and 2. Alternatively, the fill tube 22 may extend along any portion of the length of the inflatable curtain 14. The portion of the fill tube 22 positioned in the inflatable curtain 14 includes a plurality of openings (not shown) through which inflation fluid is delivered to the curtain.

The apparatus 10 also includes a cover 44 that helps support the inflatable curtain 14 in the stored condition. The cover 44 may have various constructions. For example, the cover 44 may have what is referred to as a "soft pack" construction. In a soft pack construction, the cover 44 may comprise a sheet or panel of material, such as fabric, that is wrapped or otherwise placed around the inflatable curtain 14. In one particular soft pack construction, the cover 44 is configured as a sock, sheath, or tube into which the inflatable curtain 14 and fill tube 22 are placed.

The fabric material used to construct the cover 44 may be a woven material, such as nylon or polyester, a non-woven material, such as a plastic film, or any other suitable material. The cover 44 may be constructed by interconnecting portions of the fabric material using known means, such as an adhesive, stitching, ultrasonic welding, heat bonding, or weaving the cover with an OPW construction. In one particular soft pack construction, the cover 44 may be formed by interconnecting portions of the fabric material via ultrasonic welding. This construction is shown in FIGS. 3A and 3B.

Referring to FIGS. 3A and 3B, the cover 44 may comprise a panel 80 of material that includes openings 92 cut or otherwise formed along a first edge portion 86 of the panel. The openings 92 may have any desired configuration, such as the generally rectangular notched configuration shown in FIGS. 3A and 3B. The openings 92 may intersect the lower edge 86 of the panel 80 as shown in FIGS. 3A and 3B. Alternatively, the openings 92 may be spaced from the lower edge 86 of the panel 80. In an assembled condition of the cover 44, shown in FIG. 3B, the first edge portion 86 is interconnected with an opposite second edge portion 88 by an ultrasonic weld 84. This gives the cover 44 a generally tubular sock or sheath-like configuration.

The cover 44 also includes a longitudinal tear seam 126 that extends generally parallel to the first and second edge portions 86 and 88 of the cover 44. As shown in FIGS. 3A and 3B, the tear seam 126 may be positioned generally centrally between the first and second edge portions 86 and 88 (FIG. 3A) and opposite the ultrasonic weld 84 (FIG. 3B). The tear seam 126 may, for example, comprise perforations that weaken the tear strength of the panel 80 along the tear seam.

The apparatus 10 may be assembled for installation in the vehicle 12 as a unit. For example, the apparatus 10 may comprise an inflatable curtain module 50 (FIG. 4) that includes the inflator 24 connected to the fill tube 22, which is positioned in the rolled or folded inflatable curtain 14 and packaged in the cover 44. The inflatable curtain module 50 is supported in the vehicle 12 by means 30, such as hooks or brackets, that connect the inflatable curtain 14, inflator 24, fill tube 22, cover 44, or any combination thereof, to the vehicle 12. For example, the brackets 30 may encircle and clamp onto the fill tube 22 and portions of the inflatable curtain 14 and extend through the openings 92 in the cover 44.

Upon sensing the occurrence of an event for which inflation of the inflatable curtain 14 is desired, a sensor 150 provides an actuation signal to the inflator 24 via lead wires 152. Upon actuation of the inflator 24, inflation fluid is directed through the fill tube 22 into the inflatable curtain 14. The inflating curtain 14 ruptures the cover 44 along the tear seam 126. The inflatable curtain 14 inflates and deploys under the pressure of inflation fluid provided by the inflator 24 from the stored position of FIG. 1 to the deployed position of FIG. 2.

In the deployed position, the inflatable curtain 14 is positioned between the side structure 16 and any occupants 28 of the vehicle 12. The inflatable curtain 14, when inflated, extends fore and aft in the vehicle 12 along the side structure 16 and may cover portions of an A pillar 100, B pillar 102 and a C pillar 104 of the vehicle. The inflatable curtain 14 helps absorb impacts with the curtain and helps distribute the energy of impacts throughout a large area of the curtain.

When placing the inflatable curtain 14 in the stored condition, it may be desirable to maintain a tight roll, tight fold, or tight roll and fold to help minimize the roll diameter of the curtain. Those skilled in the art will appreciate that maintaining a small roll diameter can help reduce the size of the cover 44. This may be desired, for example, to help reduce the package size of the inflatable curtain module 50 and to help reduce the amount of material used to manufacture the cover 44. According to the present invention, the inflatable curtain 14 is adapted to cooperate with tools configured to help maintain a small roll diameter when placing the curtain in the stored condition.

Referring to FIG. 5A, the inflatable curtain 14 includes a receiving portion 38 in the form of a sleeve that extends along the lower edge 36 of the curtain. The sleeve 38 may be formed in any desired manner, such as by forming the sleeve as a portion of a one piece woven inflatable curtain 14. Alternatively, the sleeve 38 could be formed by a stitched or ultrasonically welded seam 40 near the lower edge 36 of the inflatable curtain 14. As another alternative, the sleeve 38 could be formed by connecting (e.g., stitching) a pre-configured sleeve to the lower edge portion 36 of the curtain.

The sleeve 38 is configured to receive an elongated member 94, such as a bar or rod having a round or rectangular cross-section. To place the inflatable curtain 14 in the stored condition, the bar 94 is inserted or otherwise placed in the sleeve 38 as indicated generally at A in FIG. 5A. The bar 94 is then rotated about its longitudinal axis 108. The sleeve 38 is sized to provide a close fit that helps prevent the bar 94 from rotating relative to the sleeve. As a result, the sleeve 38 rotates with the bar 94 the inflatable curtain 14 is rolled up.

Referring to FIG. 5B, after the bar 94 is inserted into the sleeve 38, tension is applied to the inflatable curtain 14 in the downward direction identified generally as B in FIG. 5B. This tension may be applied mechanically (e.g. via machine), manually (e.g. via hand), or a combination of manually and mechanically (e.g. via hand operated machine). The bar 94 is then rotated about the axis 108 while maintaining the tension on the inflatable curtain 14. As a result, the inflatable curtain 14 is rolled tightly, thus providing a small or reduced roll diameter. This facilitates placing of the cover 44 over the rolled up inflatable curtain 14.

The inflatable curtain 14 is rolled up such that an upper edge 34 of the curtain 14 and the apertures 124 are oriented as shown in FIG. 5C. The cover 44 is placed over the rolled-up curtain 14 and substantially, or completely, envelops the curtain. The cover 44 is positioned such that the openings 92 in the cover are aligned with the apertures 124 in the inflatable curtain 14, as shown in FIG. 5D. The bar 94 is then removed from the inflatable curtain in the direction generally indicated at E in FIG. 5D. This leaves the tightly rolled inflatable curtain 14 packaged in the cover 44. The brackets 30 (see FIG. 4) can then be installed so as to extend through the aligned openings 124 and 92 and encircle the fill tube 22.

The inflatable curtain module 50 can thus be installed in the vehicle 12. As illustrated in FIG. 4, a vehicle roof rail 118 is located at the intersection of the side structure 16 of the vehicle and the vehicle roof 18. The side structure 16, roof 18 and roof rail 118 are formed from pieces of sheet metal that are stamped or otherwise formed into predetermined shapes and welded or otherwise connected to form a desired structure. The inner and outer pieces of sheet metal 172 and 174, respectively, are used to form the side structure 16, roof 18 and roof rail 118. A third piece of sheet metal 176 helps to form the B pillar 102 of the vehicle 12. Those skilled in the art will appreciate that the side structure 16, roof 18, roof rail 118, and B pillar 32 may have alternative configurations and/or constructions.

Fasteners 138 secure the brackets 30 and thus the inflatable curtain module 50 to the vehicle 12. When installed in the vehicle 12, the inflatable curtain module 50 is positioned adjacent the roof rail 118 near the intersection of the side structure 16 and roof 18, and extends along the roof rail 118. The inflatable curtain module 50 is oriented generally downward at an angle from the vehicle roof 18 and toward the side structure 16.

The vehicle 12 includes a headliner 110 that extends along an inner surface 112 of the roof 18 of the vehicle. The headliner 110 has a portion 114 that extends at an acute angle relative to the roof 18 adjacent the inflatable curtain module 50. The portion 114 of the headliner 110 overlies the module 50 and conceals the module in the vehicle 12. In a non-deployed condition of the inflatable curtain 14, a terminal end 116 of the headliner 110 is in abutting engagement with a trim piece 106 that overlies the B pillar 102.

Those skilled in the art will recognize that the configuration of the vehicle structure, and thus the spatial and interconnecting relationships between the vehicle structure (i.e., the side structure 16, roof 18, and roof rail 118) and the headliner 110, trim piece 106 and inflatable curtain module 50, may vary depending upon the particular design of the vehicle 12. Therefore, it will be appreciated that the vehicle structure illustrated in FIG. 4 and the spatial and interconnecting relationships between the vehicle structure and the headliner 110, trim piece 106, and inflatable curtain module 50 is for illustrative purposes and may vary without departing from the spirit of the present invention.

Figure 6B:
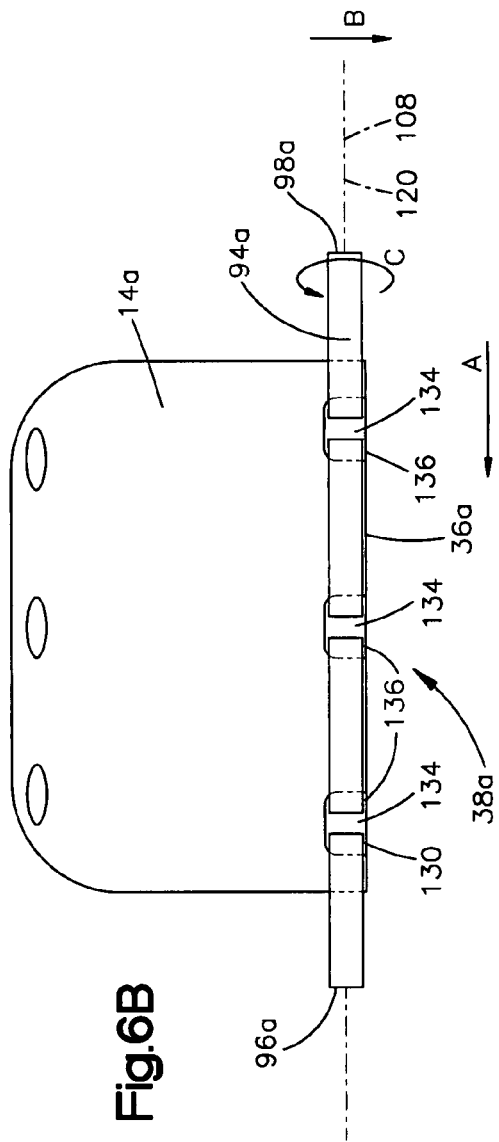

A second embodiment of the present invention is illustrated in FIGS. 6A and 6B. In FIGS. 6A and 6B, reference numbers similar to those used in FIGS. 5A-5D will be utilized, the suffix letter "a" being associated with the numerals of FIGS. 6A and 6B to avoid confusion. The embodiment of FIGS. 6A and 6B is similar to the embodiment of FIGS. 5A-5D, except that the receiving portion 38a of the inflatable curtain 14a in FIGS. 6A and 6B is different than the receiving portion 38 of FIGS. 5A-5D.

Referring to FIGS. 6A and 6B, the receiving portion 38a of the inflatable curtain 14a comprises one or more spaced apertures 130 that help define flaps 134 spaced along the lower edge 36a of the inflatable curtain 14a. The apertures 130 extend through non-inflatable portions 136 of the inflatable curtain 14a. The non-inflatable portions 136 may, for example, be a portion of the inflatable curtain 14 woven as a single layer or may be defined by a seam (stitched or woven). Although FIG. 6A depicts three non-inflatable portions 136, each having a single flap 134 defined by two apertures 130, those skilled in the art will appreciate that the receiving portion 38a may include any number of non-inflatable portions 136 and that each non-inflatable portion may include any number of flaps 134 defined by any number of apertures 130.

As shown in FIG. 6A, to place the inflatable curtain 14a in the stored condition, the elongated member 94a is slid into the receiving portion 38a of the inflatable curtain 14a in the direction A. The elongated member 94a extends through each aperture 130 and thus behind each flap 134 as viewed in FIG. 6B. This is effective to secure the elongated member 94a in the receiving portion 38a such that the inflatable curtain 14a can be placed in the stored condition in the cover 44a in a manner similar or identical to that described above in regard to FIGS. 5A-5D.

The inflatable curtain 14 may be placed in the stored condition using what is referred to herein as an "outboard roll and inboard fold" configuration. Referring to FIG. 4, according to the outboard roll and inboard fold configuration, the inflatable curtain 14 is initially rolled counterclockwise in an outboard direction (to the right as viewed in FIG. 4). This rolled portion is identified generally at 154 in FIG. 4. The inflatable curtain 14 is then folded in an inboard direction (to the left as viewed in FIG. 4) along a fold line 156. The inflatable curtain 14 when installed, is configured as shown in FIG. 4.

The outboard roll and inboard fold configuration of the inflatable curtain 14 may provide desired deployment characteristics. For example, when the inflatable curtain 14 deploys, the curtain initially unfolds along the fold line 156, which helps the curtain deploy inboard of the B pillar 102 and the vehicle trim piece 106. The rolled portion 154 of the inflatable curtain 14 unrolls generally downward and outboard toward the side structure 16, which helps the curtain inflate and deploy between any vehicle occupants 28 and the side structure.

It may be desirable to place the inflatable curtain 14 in the cover 44 in a tightly packaged manner with the outboard roll and inboard fold configuration. According to the present invention, a forked or pronged instrument or member 140 is used to maintain the inboard fold in the inflatable curtain 14 while the elongated member 94 is used to apply and maintain the tight outboard roll. Referring to FIG. 7A, the forked member 140 comprises a handle portion 142 and a pair of elongated prongs 144 that extend generally parallel to each other from the handle portion. The prongs 144 may be spaced apart relative to each other, as shown in FIG. 7A, or may be spring biased toward and against each other. The forked member 140 may be constructed of any desired material, such as metal (e.g., steel) or plastic.

To place the inflatable curtain 14 in the cover 44 while in the outboard rolled and inboard folded condition in a tightly packaged manner, the curtain 14 is initially rolled up outboard using the elongated member 94 as described above. The inboard fold is performed and the forked member 140 is inserted axially into the rolled and folded curtain as illustrated in FIG. 7B. The prongs 144 of the forked member 140 are advanced into the inflatable curtain such that one prong 144 is inserted into the center of the rolled portion 154 and the other prong 144 is received within the inboard fold 156 (FIG. 7D). As shown in FIGS. 7A and 7B, a second, similar or identical forked member 140 is likewise inserted into the inflatable curtain 14 at the opposite end of the curtain such that the prongs 144 of both forked members 140 are oriented towards each other. Although the use of two forked members 140 is shown, those skilled in the art will appreciate that, alternatively, a single forked member with prongs extending along a substantial portion of the length of the inflatable curtain 14 could be used.

The forked members 140 function to help maintain the outboard rolled and inboard folded configuration of the inflatable curtain 14 while the cover 44 is placed over the curtain. The forked member 14b may achieve this, for example, by exerting a clamping force through the inherent spring bias of the prongs 144 or through an interference with the curtain formed by the close spacing of the prongs 144.

Referring to FIG. 7B, a channel member 160 for receiving the outboard rolled and inboard folded inflatable curtain 14 is provided to help package the curtain in the cover 44. The channel member 160 has an elongated generally C-shaped configuration and may be constructed of any desired material, such as steel.

The outboard rolled and inboard folded inflatable curtain 14, with the forked members 140 installed as shown in FIG. 7B, is slid or otherwise placed in the channel member 160, as shown in FIGS. 7C and 7D. Referring to FIGS. 7E and 7F, the cover 44 is then slid or otherwise placed over the channel member 160 such that the openings 92 in cover 44 are aligned with the apertures 124 in the inflatable curtain 14. The channel member 160 is then removed by pulling an end of the channel member in a direction indicated generally at H in FIG. 7E. Thereafter, the forked members 140 are pulled out in a direction indicated generally at I in FIG. 7F, which leaves the inflatable curtain 14 packaged tightly in the cover 44 with the outboard roll and inboard fold configuration, as shown in FIG. 7G. The alignment of openings 92 (FIG. 7F) in cover 44 and the apertures 124 of inflatable curtain 14 allows the inflatable curtain module 50 to be mounted in the vehicle 12 via the brackets 30, as described above with reference to FIG. 4.

Those skilled in the art will appreciate that the channel member 160 may be used to provide rigid support for an inflatable curtain 14 having a stored condition different than the outboard rolled and inboard folded configuration described above. For example, the inflatable curtain 14 may have a stored condition in which the curtain is rolled only or folded only. In these configurations, use of the forks 140 to maintain a fold may not be necessary. Thus, in this configuration, the inflatable curtain 14 may be packaged in the cover 44 using the channel 160 only without the forks 140.

From the above description of the invention, those skilled in the art will perceive applications, improvements, changes and modifications to the present invention. Such applications, improvements, changes and modifications within the skill of the art are intended to be covered by the appended claims.

Having described the invention, we claim the following:

1. An apparatus comprising:
an inflatable vehicle occupant protection device having a stored condition for being positioned along a vehicle roof, the protection device being inflatable away from the vehicle roof to a deployed condition positioned between a side structure of the vehicle and a vehicle occupant, the protection device comprising a portion for receiving a rigid elongated member for helping to place the protection device in the stored condition by rotating the elongated member about a longitudinal axis,
the rotation of the elongated member resulting in at least one of rolling and folding of the protection device that places the protection device in the stored condition, the portion comprising an opening into which the elongated member is inserted, the portion and the elongated member being configured to form a close fit, the close fit producing a frictional engagement between the portion and the elongated member, the frictional engagement preventing relative rotation between the portion and the elongated member when the member is rotated about the longitudinal axis.

2. The apparatus recited in claim 1, wherein the elongated member comprises a bar having a non-circular cross-section, the portion for receiving the member encircling at least a portion of the bar and being dimensioned to have a close fit with the bar, the non-circular cross-section of the bar in combination with the close fit of the portion preventing relative rotation between the portion and the bar.

3. The apparatus recited in claim 1, wherein the portion for receiving the elongated member comprises a sleeve extending along a lower edge portion of the protection device.

4. The apparatus recited in claim 3, wherein the sleeve is formed integrally in a one piece woven construction of the protection device.

5. The apparatus recited in claim 3, wherein the sleeve comprises a separate component secured to the protection device.

6. The apparatus recited in claim 1, wherein the portion for receiving the elongated member comprises apertures spaced along the protection device, the elongated member being extendible through the apertures.

7. The apparatus recited in claim 6, wherein the spaced apertures help define flaps that help secure the protection device to the elongated member.

8. The apparatus recited in claim 1, further comprising a cover that envelops the protection device in the stored condition, the cover comprising a sheet of material with opposite longitudinal edge portions interconnected by an ultrasonic weld.

9. The apparatus recited in claim 1, further comprising at least one forked member for maintaining a fold in the protection device while the protection device is placed in a cover, the protection device further comprising a portion for receiving the at least one forked member.

10. The apparatus recited in claim 9, further comprising a channel member for receiving the protection device while the at least one forked member maintains a fold in the protection device, the channel providing rigid support for the protection device during insertion into the cover.

11. The apparatus recited in claim 1, wherein the elongated member comprises a bar having a rectangular cross section.

12. The apparatus recited in claim 1, wherein the elongated member comprises a solid bar.

13. The apparatus recited in claim 1, wherein the portion of the protection device for receiving the rigid elongated member is empty when the protection device is in the stored condition.

14. The apparatus recited in claim 1, wherein the portion of the protection device for receiving the rigid elongated member is empty when the protection device is in the deployed condition.

15. An apparatus for helping to place an inflatable vehicle occupant protection device in a stored condition in a vehicle, the apparatus comprising at least one forked member for maintaining a fold and a roll in the protection device while the protection device is placed in a cover, the forked member comprising spaced prongs inserted longitudinally into an end of the folded protection device, the prongs receiving folded over and abutting portions of the protection device and helping to prevent separation of the abutting portions to thereby maintain the fold and the roll in the protection device while placed in the cover.

16. The apparatus recited in claim 15, further comprising a channel member for receiving the protection device and the at least one forked member, the channel providing rigid support for the protection device during insertion into the cover.

17. The apparatus recited in claim 16, wherein the channel and the at least one forked member are removable from the protection device leaving the protection device in the cover.

18. The apparatus recited in claim 15, wherein the protection device is inflatable from the stored condition away from a roof of a vehicle to a deployed condition positioned between a side structure of the vehicle and a vehicle occupant.

19. The apparatus recited in claim 15, further comprising an elongated member receivable in a portion of the protection device and operable to help to place the protection device in the stored condition by rotating the elongated member about a longitudinal axis, the rotation of the elongated member resulting in at least one of rolling and folding of the protection device that places the protection device in the stored condition, the portion comprising an opening into which the elongated member is inserted, the portion and the elongated member being configured to form a close fit, the portion and the elongated member frictionally engaging each other to help prevent relative rotation between the portion and the elongated member when the member is rotated about the longitudinal axis.

20. The apparatus recited in claim 19, wherein the elongated member is receivable in a sleeve formed in the protection device.

21. The apparatus recited in claim 19, wherein the elongated member is receivable in apertures spaced along the protection device.

22. The apparatus recited in claim 15, wherein portions of the protection device on opposite sides of a fold in the protection device are positioned between the prongs such that the prongs help maintain the fold in the protection device.

23. The apparatus recited in claim 15, wherein a first prong of each forked member is adapted to be inserted into the center of the rolled protection device and a second prong of each forked member is adapted to be inserted between the fold and the roll in the protection device.

24. A method for helping to protect an occupant of a vehicle that has a side structure and a roof, the method comprising the steps of:
 providing an inflatable vehicle occupant protection device;
 placing the protection device in at least one of a rolled and folded condition;
 placing the protection device in an elongated channel;
 providing a cover having an elongated tubular construction and including an open end;
 inserting the channel and protection device into the open end of the cover;
 positioning the channel and protection device within the tubular cover such that the cover encircles the protection device; and
 removing the channel from the cover, leaving the protection device packaged in the cover.

25. The method recited in claim 24, further comprising the step of inserting at least one forked member longitudinally in the at least one of rolled and folded protection device to help maintain a fold in the protection device.

26. The method recited in claim 24, wherein the step of placing the protection device in at least one of a rolled and folded condition comprises:
 inserting an elongated member into a portion the protection device; and
 rotating the elongated member about a longitudinal axis to place the protection device in the at least one rolled and folded condition, the portion and the elongated member having a close fit that produces a frictional engagement preventing relative movement between the portion and the elongated member when the member is rotated about the longitudinal axis.

27. An apparatus comprising:
 an inflatable vehicle occupant protection device having a stored condition for being positioned along a vehicle roof, the protection device being inflatable away from the vehicle roof to a deployed condition positioned between a side structure of the vehicle and a vehicle occupant, and
 a rigid elongated member for helping to place the protection device in the stored condition by rotating the elongated member about a longitudinal axis, the rotation of the elongated member resulting in at least one of rolling and folding of the protection device that places the protection device in the stored condition,
 the protection device including a portion into which the elongated member is inserted, the portion and the elongated member being configured to form a close fit, the close fit producing a frictional engagement between the portion and the elongated member, the frictional engagement preventing relative rotation between the portion and the elongated member when the member is rotated about the longitudinal axis.

* * * * *